(12) United States Patent
Haid et al.

(10) Patent No.: US 11,288,123 B2
(45) Date of Patent: Mar. 29, 2022

(54) SYSTEMS AND METHODS FOR APPLYING CHECKPOINTS ON A SECONDARY COMPUTER IN PARALLEL WITH TRANSMISSION

(71) Applicant: Stratus Technologies Bermuda, Ltd., Hamilton (BM)

(72) Inventors: Steven Michael Haid, Bolton, MA (US); Wendy J. McNaughton, Hopkinton, MA (US)

(73) Assignee: STRATUS TECHNOLOGIES IRELAND LTD.

( * ) Notice: Subject to any disclaimer, the term of this patent is extended or adjusted under 35 U.S.C. 154(b) by 0 days.

(21) Appl. No.: 16/900,913

(22) Filed: Jun. 13, 2020

(65) Prior Publication Data

US 2021/0034465 A1    Feb. 4, 2021

Related U.S. Application Data

(60) Provisional application No. 62/881,295, filed on Jul. 31, 2019.

(51) Int. Cl.
*G06F 11/14* (2006.01)
*G06F 12/0882* (2016.01)
*G06F 11/07* (2006.01)

(52) U.S. Cl.
CPC ...... *G06F 11/1407* (2013.01); *G06F 11/0772* (2013.01); *G06F 11/1451* (2013.01);
(Continued)

(58) Field of Classification Search
CPC ............. G06F 11/1407; G06F 11/1469; G06F 11/1464; G06F 12/0882; G06F 11/1451;
(Continued)

(56) References Cited

U.S. PATENT DOCUMENTS 6,355,991 B1  3/2002 Goff et al.
6,633,996 B1  10/2003 Suffin et al.
(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.
(Continued)

*Primary Examiner* — Yair Leibovich
(74) *Attorney, Agent, or Firm* — K&L Gates LLP

(57) ABSTRACT

The disclosure relates to a method of checkpointing. The method may include determining, by the primary computer, when to initiate a checkpoint point operation; dividing, at the primary computer, checkpoint data into two or more groups, wherein each group includes one or more pages of memory; transmitting a first group to the secondary computer; upon receiving, by the secondary computer, the first group, correlating memory pages in the first group with pages in memory on the secondary computer; determining, at the secondary computer, which bytes of memory pages of the first group differ from the correlated pages stored in memory in the secondary computer; and applying data from the first group by swapping differences between the memory pages of the first group and the correlated memory pages stored in the secondary computer. Where at least some of these multiple operations are performed in parallel during a subset of the overall checkpoint operation. The simultaneous performance of various memory manage checkpoint operations is advantageous in various fault tolerant systems. The differences may be N-byte differences such as 8-byte differences.

12 Claims, 8 Drawing Sheets

(52) U.S. Cl.
CPC ...... *G06F 11/1461* (2013.01); *G06F 11/1464* (2013.01); *G06F 11/1469* (2013.01); *G06F 12/0882* (2013.01)

(58) Field of Classification Search
CPC ............. G06F 11/0772; G06F 11/1461; G06F 2201/835; G06F 2201/84
USPC ........................................................ 714/15
See application file for complete search history.

(56) References Cited

U.S. PATENT DOCUMENTS

| | | | |
|---|---|---|---|
| 6,687,851 | B1 | 2/2004 | Somers et al. |
| 6,691,225 | B1 | 2/2004 | Suffin |
| 6,691,245 | B1 * | 2/2004 | DeKoning .......... G06F 11/2028 714/15 |
| 6,691,257 | B1 | 2/2004 | Suffin |
| 6,708,283 | B1 | 3/2004 | Nevin et al. |
| 6,718,474 | B1 | 4/2004 | Somers et al. |
| 6,766,413 | B2 | 7/2004 | Newman |
| 6,766,479 | B2 | 7/2004 | Edwards |
| 6,802,022 | B1 | 10/2004 | Olson |
| 6,813,721 | B1 | 11/2004 | Tetreault et al. |
| 6,842,823 | B1 | 1/2005 | Olson |
| 6,862,689 | B2 | 3/2005 | Bergsten et al. |
| 6,874,102 | B2 | 3/2005 | Doody et al. |
| 6,886,171 | B2 | 4/2005 | MacLeod |
| 6,928,583 | B2 | 8/2005 | Griffin et al. |
| 6,970,892 | B2 | 11/2005 | Green et al. |
| 6,971,043 | B2 | 11/2005 | McLoughlin et al. |
| 6,996,750 | B2 | 2/2006 | Tetreault |
| 7,065,672 | B2 | 6/2006 | Long et al. |
| 7,496,786 | B2 | 2/2009 | Graham et al. |
| 7,496,787 | B2 | 2/2009 | Edwards et al. |
| 7,669,073 | B2 | 2/2010 | Graham et al. |
| 7,904,906 | B2 | 3/2011 | Puthukattukaran et al. |
| 7,958,076 | B2 | 6/2011 | Bergsten et al. |
| 8,117,495 | B2 | 2/2012 | Graham |
| 8,161,311 | B2 | 4/2012 | Wiebe |
| 8,234,521 | B2 | 7/2012 | Graham et al. |
| 8,271,416 | B2 | 9/2012 | Al-Biek et al. |
| 8,312,318 | B2 | 11/2012 | Graham et al. |
| 8,381,012 | B2 | 2/2013 | Wiebe |
| 8,812,907 | B1 | 8/2014 | Bissett et al. |
| 9,251,002 | B2 | 2/2016 | Manchek et al. |
| 9,588,844 | B2 | 3/2017 | Bissett et al. |
| 9,652,338 | B2 | 5/2017 | Bissett et al. |
| 9,760,442 | B2 | 9/2017 | Bissett et al. |
| 10,216,598 | B2 | 2/2019 | Haid et al. |
| 10,360,117 | B2 | 7/2019 | Haid et al. |
| 2001/0042202 | A1 | 11/2001 | Horrath et al. |
| 2002/0016935 | A1 | 2/2002 | Bergsten et al. |
| 2002/0070717 | A1 | 6/2002 | Pellegrino |
| 2003/0046670 | A1 | 3/2003 | Marlow |
| 2003/0095366 | A1 | 5/2003 | Pellegrino |
| 2006/0222125 | A1 | 10/2006 | Edwards et al. |
| 2006/0222126 | A1 | 10/2006 | Edwards et al. |
| 2006/0259815 | A1 | 11/2006 | Graham et al. |
| 2006/0274508 | A1 | 12/2006 | LaRiviere et al. |
| 2007/0011499 | A1 | 1/2007 | Begsten et al. |
| 2007/0028144 | A1 | 2/2007 | Graham et al. |
| 2007/0038891 | A1 | 2/2007 | Graham |
| 2007/0106873 | A1 | 5/2007 | Lally et al. |
| 2007/0174484 | A1 | 7/2007 | Lussier et al. |
| 2009/0249129 | A1 | 10/2009 | Femia |
| 2011/0131231 | A1 * | 6/2011 | Haas ................... G06F 12/0246 707/769 |
| 2014/0279929 | A1 * | 9/2014 | Gupta ................. G06F 11/1451 707/683 |
| 2015/0205688 | A1 | 7/2015 | Haid et al. |
| 2015/0263983 | A1 | 9/2015 | Brennan et al. |
| 2017/0324609 | A1 | 11/2017 | Hong et al. |
| 2018/0046480 | A1 | 2/2018 | Dong et al. |
| 2018/0143885 | A1 | 5/2018 | Dong et al. |
| 2020/0050523 | A1 | 2/2020 | Pawlowski et al. |
| 2021/0034447 | A1 | 2/2021 | Horvath et al. |
| 2021/0034464 | A1 | 2/2021 | Dailey et al. |
| 2021/0034465 | A1 | 2/2021 | Haid et al. |
| 2021/0034483 | A1 | 2/2021 | Haid |
| 2021/0034523 | A1 | 2/2021 | Dailey |
| 2021/0037092 | A1 | 2/2021 | Cao |
| 2021/0342232 | A1 * | 11/2021 | Gopalan ............... G06F 11/301 |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

SYSTEMS AND METHODS FOR APPLYING CHECKPOINTS ON A SECONDARY COMPUTER IN PARALLEL WITH TRANSMISSION

RELATED APPLICATIONS

This application claims the benefit of priority to U.S. Provisional Application No. 62/881,295 filed Jul. 31, 2019, and which is incorporated herein by reference in its entirety.

FIELD

The disclosure relates generally to the field of fault tolerant computing and more specifically to checkpointing in a fault tolerant server.

BACKGROUND

There are a variety of ways to achieve fault tolerant computing in a computing system. As an example, it is possible to connect two (or more) computers, such that one computer, the primary computer (also referred to as machine or node) actively makes computations or obtains data requested by a client while the secondary computer makes the same computations as the primary computer to shadow the results of the primary computer. This form of fault tolerant computing, termed active-active fault tolerance, is performed in case the primary computer, or hardware or software component thereon, experiences some type of failure. In these systems, the information about the current state of the primary computer must be periodically saved to the secondary computer so that the primary and secondary computers are substantially synchronized and the secondary computer can substantially take over computation at the point in the calculations where the active primary computer experienced a failure. The periodic transfer of data to maintain synchrony between the states of the primary and secondary computers is termed checkpointing. There are various memory management and timing challenges that arise when checkpointing in a fault tolerant system.

The present disclosure addresses these challenges and others.

SUMMARY

In one embodiment, the method of checkpointing in a system have a primary computer and a secondary computer, wherein each of the primary computer and the secondary computer comprise available memory and reserved memory, the method including determining, by the primary computer, when to initiate a checkpoint point operation; dividing, at the primary computer, a set of checkpoint data into a plurality of subsets, wherein each subset includes one or more memory pages of checkpoint data; transmitting a subset of the plurality of subsets to the secondary computer; upon receiving, by the secondary computer, the subset, storing the subset of the plurality of subsets in reserved memory; correlating, by the secondary computer, the subset with pages in available memory on the secondary computer; determining, by the secondary computer, which bytes of the subset differ from the correlated available pages in the available memory in the secondary computer; and applying checkpoint data from the subset by swapping differences between the subset pages in reserved memory and the stored data in correlated memory pages stored in the secondary node.

One or more of the following features may be included. In one embodiment, the method may include the differences are N-byte differences. In one embodiment, the method may include transmitting another subset of the plurality of subsets to the secondary computer in parallel with applying the current checkpoint data from the current subset. In one embodiment, the method may include applying the checkpoint data from the current subset occurs simultaneously with transmitting another subset from the plurality of subsets. In one embodiment, the method may include where correlating includes looking up pages in available memory corresponding to each of the pages of checkpoint data within the current subset.

One or more of the following features may be included. In one embodiment, the method may include where determining, at the secondary node, includes comparing each byte within each memory page of the first group to each byte within the corresponding page stored memory in the secondary node to determine which bytes of each memory page of the first group differ from the corresponding memory page in the stored memory on the secondary node. In one embodiment, the method may include retaining each checkpoint subset in reserved memory on the secondary computer until the entire checkpoint has been applied to available memory on the secondary computer.

One or more of the following features may be included. In one embodiment, the method may include upon notification of failure at the primary computer, reversing the checkpoint on the secondary computer by: swapping each of the checkpointed data in available memory on the secondary computer with the original data from available memory on the secondary computer that resides in reserved memory to restore the data stored on the available memory of the secondary computer to a pre-checkpoint state.

In an embodiment, a method of checkpointing in a system have a primary computer and a secondary computer, wherein each of the primary computer and the secondary computer comprise available memory and reserved memory, the method includes transmitting checkpoint data from a the primary computer to the secondary computer, the checkpoint data comprising K memory pages; upon receiving, by the secondary computer, K memory pages, storing the K memory pages in reserved memory; correlating, by the secondary computer, the K memory pages with secondary memory pages in available memory on the secondary computer; determining, by the secondary computer, which bytes of the K memory pages differ from the correlated available secondary memory pages; and applying checkpoint data from the K memory pages by swapping differences between the K memory pages in reserved memory and the stored data in the correlated available secondary memory pages stored in the secondary computer.

One or more of the following features may be included. In one embodiment, the method may include the differences are N-byte differences. In one embodiment, the method may include where N is selected from the group consisting of 2, 4, 8, 16, 32, 64, 128, 256, 512, or 1024. In one embodiment, the method may include where K is less than or equal to 512. In one embodiment, the method may include determining, by the primary computer, when to initiate a checkpoint operation. In one embodiment, the method may include if checkpoint data is equal to or greater than about M pages, dividing, at the primary computer, the checkpoint data into a plurality of subsets, wherein all subsets comprises the K memory pages. In one embodiment, the method may include where M is about 512. In one embodiment, the method may include retaining checkpoint data in reserved memory on secondary computer; and rolling back secondary computer using retained checkpoint data to a pre-checkpoint state in the event of failure in checkpoint process or in primary computer.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the disclosure, the scope of which is defined only by the claims.

DETAILED DESCRIPTION

Figure 1:
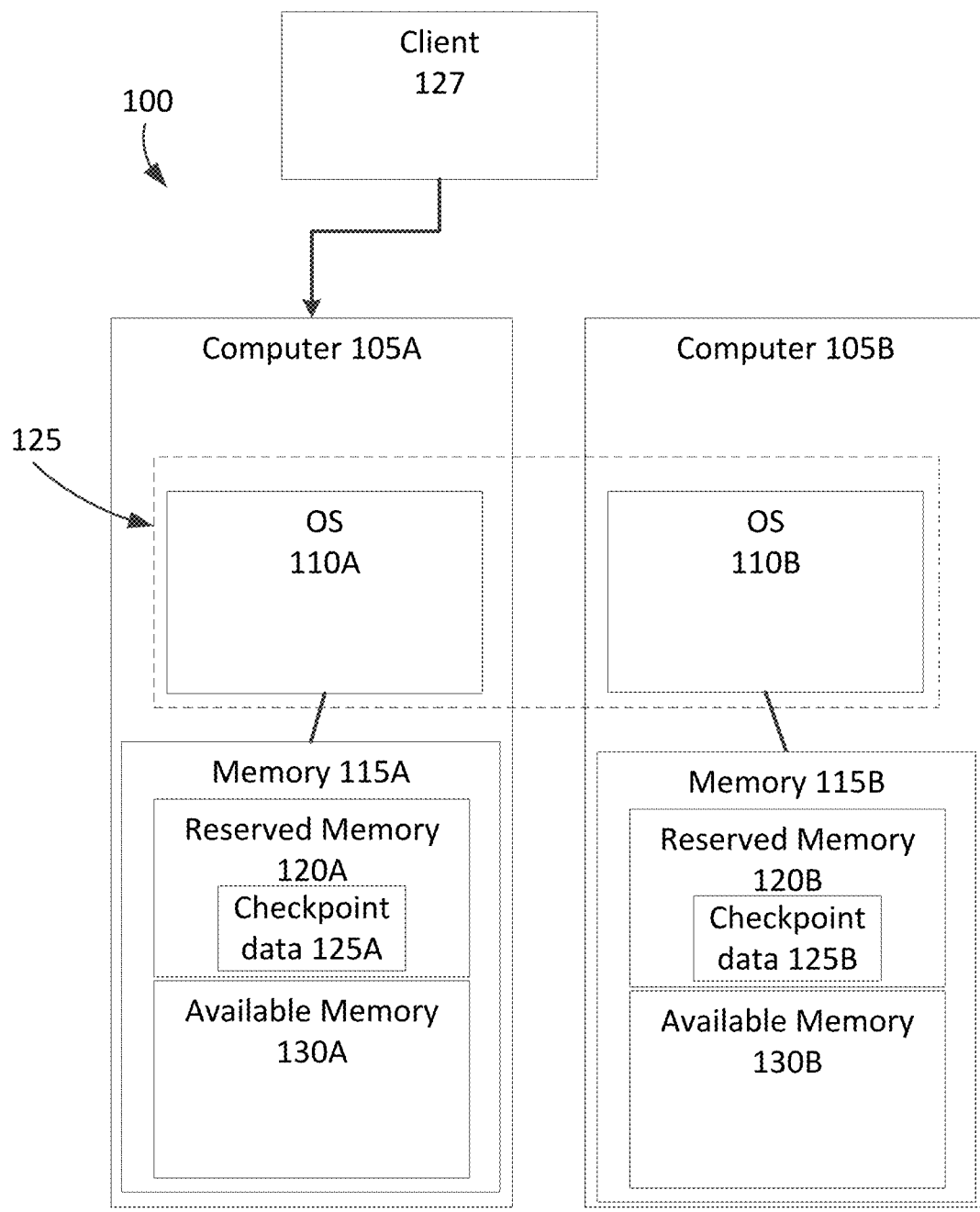
FIG. 1 is a schematic diagram of an exemplary embodiment of a computer system suitable for parallelized checkpoint operations between a primary node and a secondary node, in accordance with the present disclosure.

In general, the disclosure relates to memory management and checkpointing optimizations in a fault tolerant computing system, generally referred to as a system or computer system. In one embodiment, the computing system is an active active fault tolerant system. The periodic transfer of data to maintain synchrony between the states of the primary and secondary computers is termed checkpointing. A checkpoint defines the operational state of the primary computer at a point in time when the data is to be transferred from the primary computer to the secondary computer. A checkpoint controller, which is typically a software module, determines when a checkpoint will be initiated. During a checkpoint, the processing on the primary computer is at some point paused, so that the final state of the primary machine and associated memory is not changed during the checkpoint interval and once the relevant data is transferred, both the primary and secondary computers are in the same state. The paused computer is "blacked out" or otherwise unavailable for its intended purpose, which is clearly counter to purpose of operating such a computer. When the transfer of information between the primary and secondary computers is complete, the checkpoint is complete, and the execution by the primary and secondary computers is resumed and continues to run the application until the next checkpoint, when the process repeats.

Checkpoints can be determined by the checkpoint controller either to occur by the passage of a fixed amount of elapsed time from the last checkpoint, or by the occurrence of some event, such as: the number pages of memory written to (termed dirty pages); the occurrence of a network event (such as network acknowledgement output from the primary computer); or the occurrence of excessive buffering on the secondary computer (as compared to available memory) during the execution of the application. Elapsed time checkpointing is considered fixed checkpointing, while event based checkpointing is considered dynamic or variable-rate checkpointing.

In summary, the process of checkpointing generally involves copying the operational state (both memory and processor state) of the primary system to the secondary system In this way, the two systems operate in a fault tolerant manner, with the secondary system available if the primary system fails or experiences a significant error. This must be done while minimizing the amount of time the primary and secondary computers are paused while the data is moved from the primary to secondary computer.

Minimizing the time to complete a checkpoint operation is challenging when trying to design a fault tolerant computing system. Traditionally, to achieve target levels of fault tolerance and uptime, computing systems need to transfer all of the checkpoint data from a source to a destination before the checkpoint data can be used to update the computing system. However, the computer system also takes a significant amount of time to transfer the checkpoint data, which can impede the efficiency of the computer system.

Generally, during the time period for a checkpoint operation, the majority (between 55 to 90%) of the time period is spent copying and applying the contents of the checkpoint from the primary node to the secondary node. Since the system being checkpointed is effectively unavailable or blacked out for its intended purpose and transactions during this checkpoint operation, parallelizing the copy and apply operations and decreasing the time spent in blackout/unavailability of system being check pointed can significantly increase performance by shortening this period. Thus, in one embodiment the time period for the checkpoint operation performing the copy operation in parallel with the apply operation can reduce the time period of the checkpoint operation by between 45% to about 55% percent. In part, the disclosure describes systems and method for a fault tolerant system that is controlled and organized to receive and apply the checkpoint in parallel while maintaining the correct operation should the primary fail during receipt of a checkpoint by the secondary.

In various embodiments, the disclosure describes a computer system that implements checkpointing process optimizations between a primary node and a secondary node. In one embodiment, a given node, such as a primary node, secondary node, etc. may include one or more computing devices, processors, memory, communication devices, buses, network interface devices, power sources, and other hardware and devices disclosed herein suitable for implementing a fault tolerant computing system. Two nodes may be interconnected or linked as part of an active active fault tolerant system.

The computer system supports and facilitates committing checkpoint data from the primary node to the secondary node more quickly than conventional methods. In various embodiments, a computer system analyzes and/or determines which memory pages have changed since the last checkpoint and compiles those memory pages to create the next set of checkpoint data. In various embodiments, the computer system divides the checkpoint data into subsets of memory pages and sends each subset from the primary node to the secondary node. These subsets can be transmitted during a first time period and committed or applied during a second time period. Generally, the first time period and the second time period overlap in whole or in part. The transmission and commitment or application of groups of memory pages/data can be performed simultaneously. In part, the disclosure relates to the first time period overlapping with the second time period by varying amounts. In various embodiments, the amount of overlap between the time periods ranges from about 100% to about 1%.

Additional details relating to applying memory pages transferred from the primary to secondary are discussed herewith. Upon receipt of a subset of modified memory pages from the primary computer, the secondary computer performs byte comparisons of each modified memory page within the received subset of memory pages with corresponding memory pages in memory of the secondary node. In one embodiment, an 8-byte compare operation is used, but other N-byte compare operations can be used wherein N is a positive integer or a positive even integer, for example. In various embodiments, when any differences are detected between the subset of modified memory pages from the primary computer and the corresponding memory pages in the secondary computer, the secondary computer swaps the modified bytes in memory of the secondary computer with original bytes from the corresponding memory pages of the primary computer memory.

As a result, the modified memory pages from the primary computer are committed to the secondary computer. In turn, the previous contents of memory pages of the secondary computer memory are saved in the reserved memory of secondary. Previously, this reserved memory held the checkpointed memory data from the primary computer. This allows the secondary computer to update its memory while simultaneously retaining the previous data from the secondary computer's memory. This is done so that if there is a failure of the primary computer before there is a complete transfer of modified memory data, the data in the secondary computer's memory prior to the start of the current checkpoint can be recovered and the secondary computer can take over as the new primary computer using the data and state from the previous checkpoint.

In various embodiments, as each new group of memory pages is received, the secondary node continues updating its own regions of memory until all groups of memory pages have been received from the primary node. In case of a failure, the secondary node retains all information needed to rollback any changes made due to the partially completed checkpoint process. In various embodiments, this process not only accelerates the commitment of checkpoint data, but also increases system stability in case of failure.

FIG. 1 is a simplified illustration of an embodiment of a computer system enabled to execute checkpoints between a primary computer or node and a secondary computer or node, in accordance with an embodiment of the disclosure. As shown, the computer system 100 includes primary computer 105A and secondary computer 105B. In this embodiment, primary computer 105A is in communication with client 127. Primary node 105A includes operating system (OS) 110A and memory 115A. Secondary node 105B includes operating system (OS) 110B and memory 115B. Memory 115A and memory 115B are typically implemented as physical memory such as RAM.

Each memory 115A, 115B can include reserved memory 120A, 120B, respectively as shown. The reserved memory of primary computer 105A stores checkpoint data 125A in one embodiment. Similarly, the reserved memory of secondary computer 105A stores checkpoint data 125B in one embodiment. In addition to each respective reserved memory 120A, 120B, each memory 115A, 115B, has available memory 130A, 130B as shown. The dotted box 125 is a group that indicates that OS 110A and OS 110B are grouped to provide fault tolerance functionality to client 127 using the computer system 100. This can be implemented as an active active fault tolerant system. A given group can include memory pages, bytes, bit streams, or other units or combinations of units of memory data or data structures.

In this embodiment, memory 115A and memory 115B represents all memory on each respective computer or node. A portion of memory is reserved for the storage of node-specific information such as checkpoint data. The remainder of memory is available for use by the operating system. Checkpoint data is accumulated on the primary computer and stored in this area of reserved memory 120A. In various embodiments, this area of reserved memory is referred to as a cache or checkpoint data cache and is used on each node (primary and secondary) for storing checkpoint data. This checkpoint data 125A represents modified pages from available memory 130A since the last checkpoint. At the time a checkpoint is taken, checkpoint data 125A on the primary computer is broken up into subsets and transmitted to the secondary computer where it is stored in its own area of reserved memory 120B as checkpoint data 125B.

Figure 2:
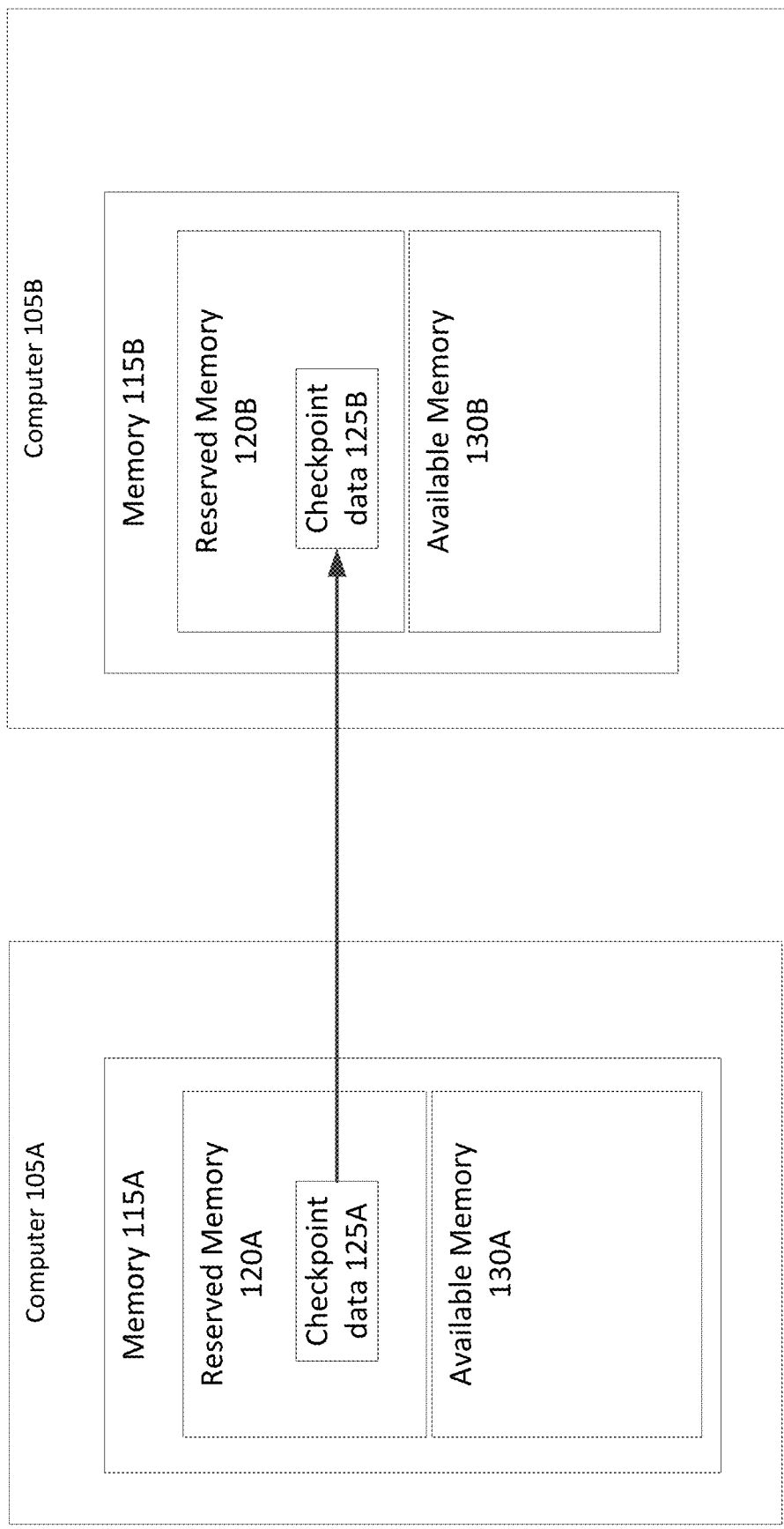
FIG. 2 is a schematic diagram of the computer system of FIG. 1 in operation, in accordance with the present disclosure.

FIG. 2 is an embodiment of the computer system in operation, showing how checkpoint data is moved from the primary computer or node to the secondary computer or node. As shown, checkpoint data 125A includes memory pages from available memory 130A that have been modified since the last checkpoint. Primary computer 105A copies the checkpoint data 125A to the checkpoint data cache in reserved memory 120B on secondary computer 105B. While primary computer 105A is in process of copying checkpoint data 125A, the secondary computer 105B updates available memory 130B with checkpoint data 125B received from primary computer 105A. Data copy operations of checkpoint data occur over time and occur simultaneously with the commitment/application of previously copied checkpoint data. If a failure occurs during the checkpoint process, secondary computer 105B rolls back any changes made to the available memory 130B using received checkpoint data 125B and continues processing with the available memory 130B in a pre-checkpoint state as described below.

Figure 3:
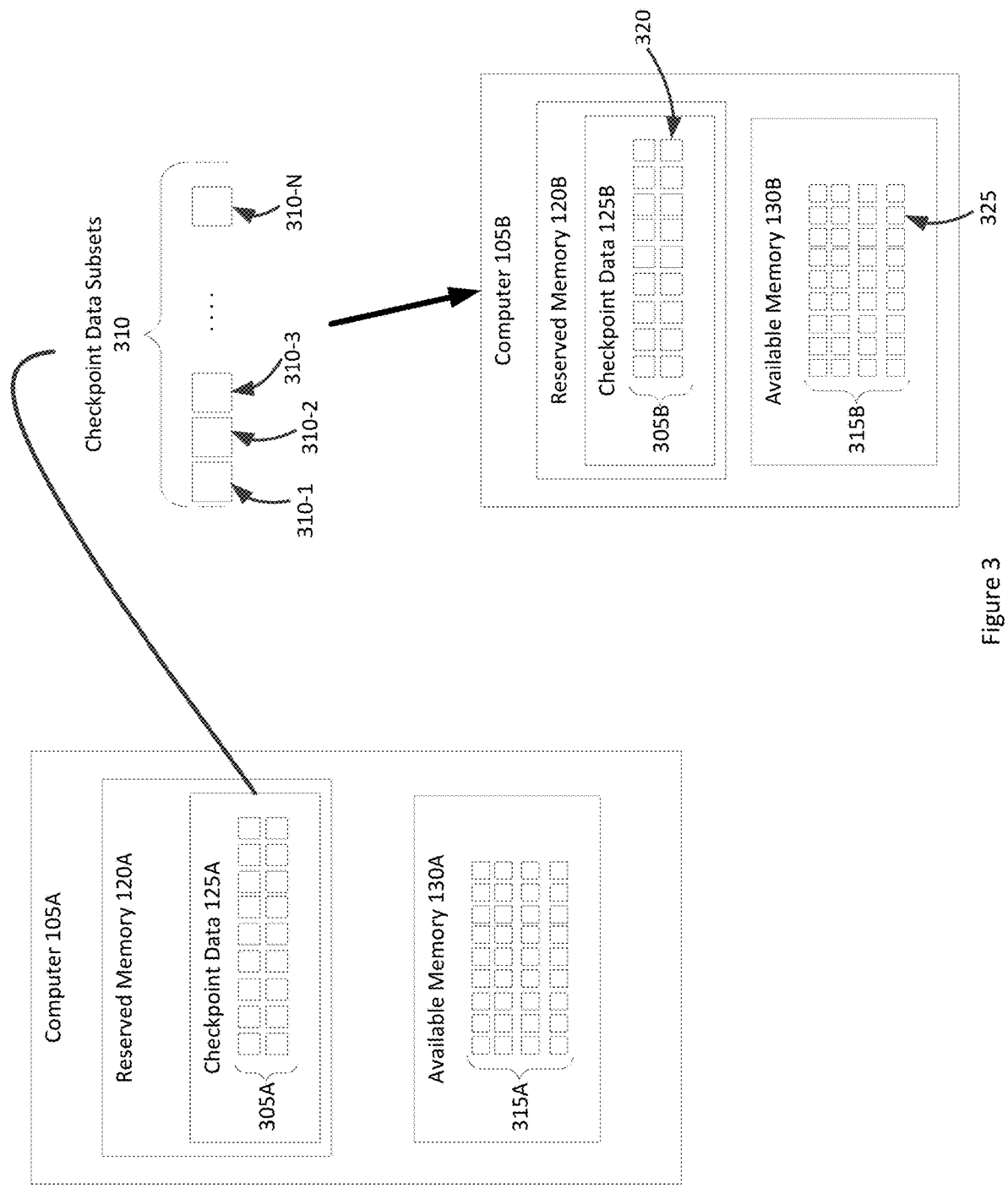
FIG. 3 is a more detailed schematic diagram of the computer system of FIG. 1, showing how the groups of memory pages/memory data are moved from the primary node to the secondary node.

FIG. 3 is an embodiment of the computer server in operation, showing more detail of how groups are moved from the primary computer or node to the secondary computer or node. As shown, available memory 130A in primary computer 105A includes memory pages 315A. When primary computer 105A determines that a checkpoint is necessary, primary computer 105A creates checkpoint data 305A in reserved memory 120A and copies the checkpoint data 305A to reserved memory 120B on secondary computer 105B. Checkpoint data 305A is accumulated during operation of the primary computer as available memory pages are modified. Checkpoint data 305A includes memory pages 305A, which are a subset of memory pages 315A that have been modified since the last checkpoint. Primary computer 105A divides the memory pages 305A of checkpoint data 125A into checkpoint data subsets (310-1-310-N, 310 generally). Each of the checkpoint data subsets 310 contains one or more of memory pages 305A from checkpoint data 125A. Primary computer 105A copies each of the checkpoint data subsets 310 to reserved memory 120B in secondary computer 105B. Each of the groups 310 are sent to node 105B.

Secondary computer 105B updates available memory 130B using received checkpoint data subset 310-1. Secondary computer 105B determines which locations referenced by memory pages 305B correspond to locations referenced by memory pages 315B stored in available memory 130B. In this example, locations referenced by memory page 320 correspond to locations referenced by memory page 325B in available memory 130B. Secondary computer 105B compares memory page 320 in reserved memory to memory page 325 in available memory 130B to determine which bytes within memory page 325 differ and need to be updated from memory page 320.

Upon finding differences in memory page 325, secondary computer 105B updates memory page 325 with bytes from memory page 320 and stores the original bytes from memory page 325 in memory page 320. Secondary computer 105B continues processing each memory page within checkpoint data subset 310-1 and similarly processes each received checkpoint data group 310 from primary computer 105A until all of the checkpoint data 125A has been received. In one embodiment, a given checkpoint operation comprises multiple operations that may include copy checkpoint data, compare memory, update memory, and others. These multiple operations are performed in parallel during a subset of the overall checkpoint operation. This subset can include between about 30% to about 60% of checkpoint operation duration.

If a failure occurs on primary computer 105A during a checkpoint operation, the secondary computer 105B retains the original data to revert to a pre-checkpoint state. During any failure, only a portion of the checkpoint data groups 310 are received by the secondary computer 105B. In this failure situation, secondary computer 105B uses retained checkpoint data subsets 310 stored in reserved memory 120B to roll back each update made to the memory pages 315B of the available memory 130B. Specifically, secondary computer 105B compares each memory page within each of the checkpoint data subset 310 stored on secondary computer 105B in reserved memory 120B with each corresponding memory page 315B in available memory 130B to determine which bytes need to reverted back to obtain the pre-checkpoint state. In various embodiments, an undo, reversion, or reverse process is used that is informed by changed bytes to effectively rollback a given checkpoint on a case by case basis.

In this embodiment, when a subset of checkpoint data (310) is received by the secondary computer 105B and stored in reserved memory 120B, it can then proceed with applying those pages to memory on the secondary computer 105B. In this embodiment, data swap of bytes performed on the secondary computer occurs between the checkpoint data 305B stored in reserved memory 120B and the corresponding pages in available memory 130B.

Figure 4:
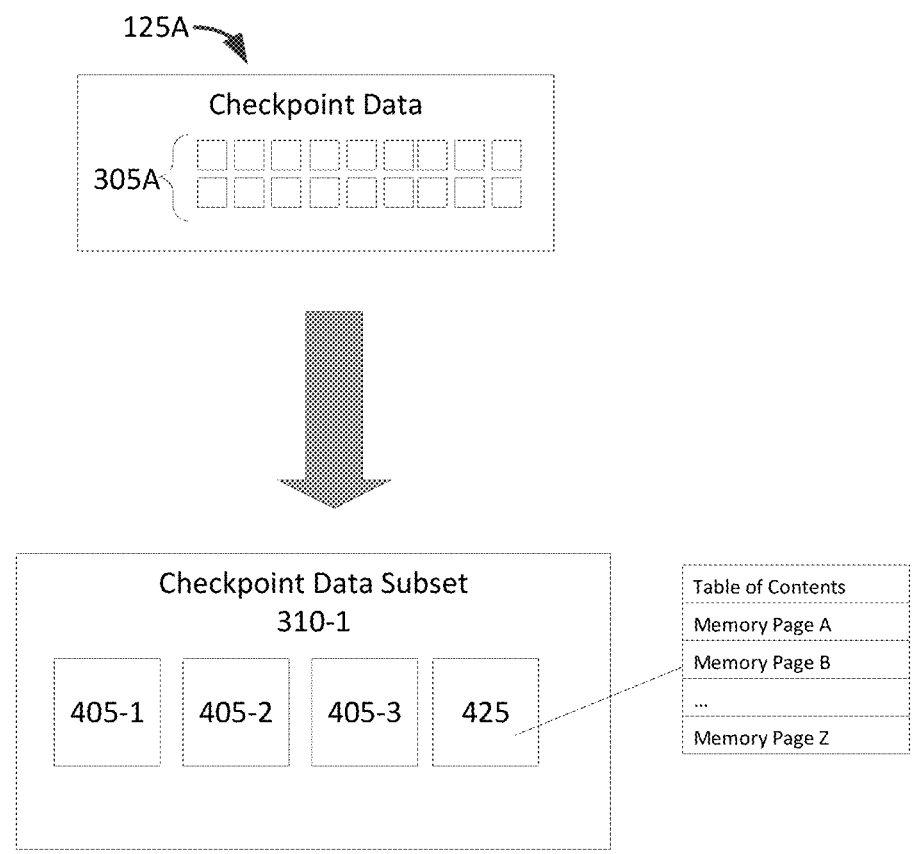
FIG. 4 is a diagram showing the contents of a subset of memory data in relation to checkpoint data, in accordance with an embodiment of the disclosure.

FIG. 4 is a diagram showing the contents of a checkpoint data subset in relation to checkpoint data, in accordance with an embodiment of the disclosure. As shown, checkpoint data 125A includes memory pages 305A. Specifically, in this embodiment, checkpoint data 125A is comprised of eighteen (18) of memory pages 305A. Checkpoint data subset 310-1 is a first checkpoint data subset of two or more checkpoint data group that contain all of the memory pages 305A of the checkpoint data 125A to be sent to the secondary computer 105B. As shown, checkpoint data subset 310-1 contains the memory pages 405-1, 405-2, and 405-3, which are a subset of memory pages 305A. Checkpoint data group 310-1 also includes table of contents 425, which indicates which memory pages 315A from available memory 130A correspond to memory pages 405-1, 405-2, and 405-3. Secondary computer 105B uses the table of contents 425 to correlate a memory page of the memory pages 315B with each memory page within a checkpoint data subset 310 received at the secondary computer 105B. The table of contents can be looked up, reviewed, or otherwise parsed. In one embodiment, a table of contents is generated for each sub set.

Figure 5:
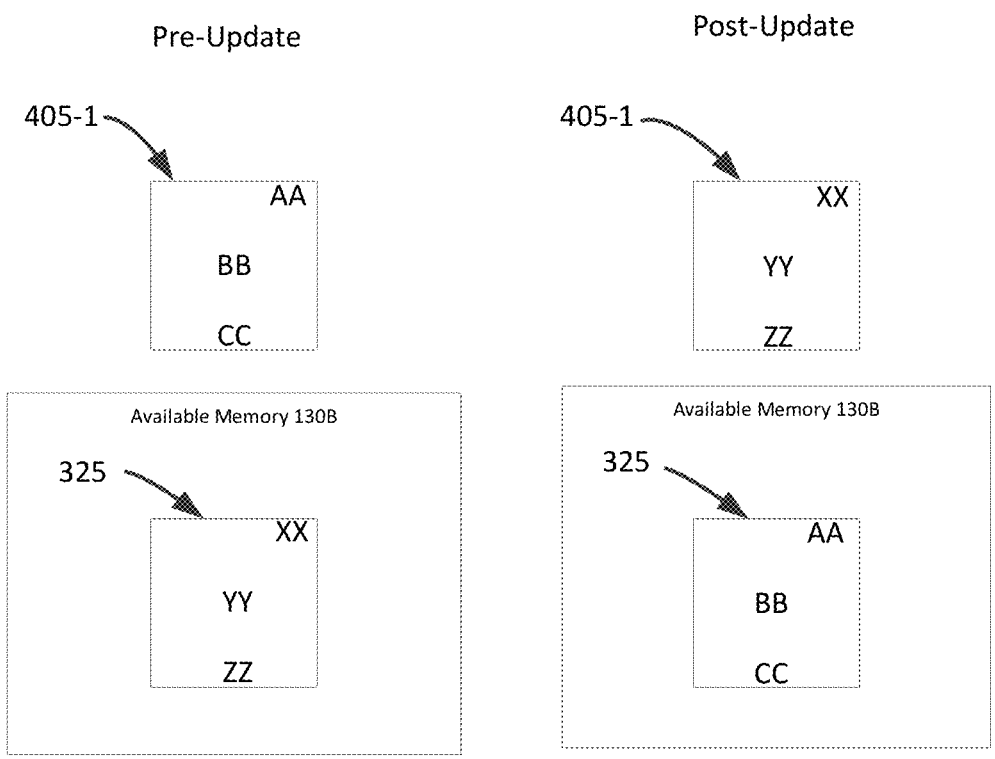
FIG. 5 is a block diagram showing how changed bytes within various memory pages are swapped according to an embodiment of the disclosure.

FIG. 5 is a block diagram showing how the bytes within each page are swapped when updating a memory page according to an embodiment of the disclosure. Memory page 405-1 in reserved memory 120B on the secondary computer 105B and memory page 325 in available memory 130B, also in secondary computer 105B are shown in a pre-update and post-update state. The pre-update state, shown to the left, shows the contents of memory page 405-1 and the contents of memory page 325 before the secondary computer 105B has updated memory page 325. The post-update state, shown to the right, shows that the contents of memory page 405-1 and the contents of memory page 325 have been swapped in comparison to the pre-update state. Upon receipt of a checkpoint data subset of memory pages, the secondary computer updates corresponding memory pages in available memory 130B while retaining the original pre-update data in case of an occurrence of a failure. AA, BB, CC, XX, YY, and ZZ correspond to memory data such as bytes, domains, ranges, segments or subsets of memory pages or other units of memory or groups that are used for a given primary and secondary computer.

Figure 6A:
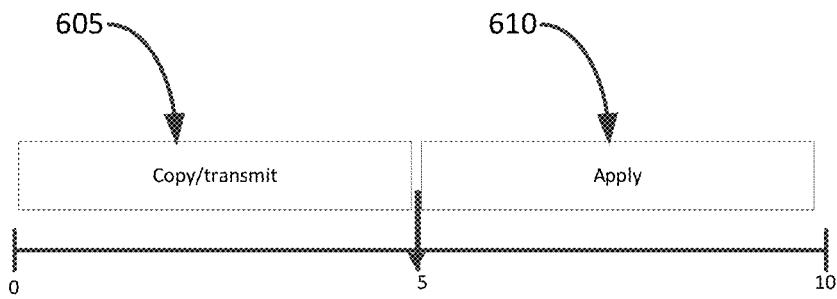
FIG. 6A is a diagram showing an embodiment of the timing of the transfer of data and the application of the data memory.

Refer to FIG. 6A, which is a diagram showing an embodiment of the timing of the transfer of data and the application of the data memory. Generally, the process of applying a checkpoint to a secondary computer is divided into two steps. A first step 605 is the copying or transmitting of checkpoint data from a primary computer to a secondary computer. Once the first step 605 is complete, the secondary computer can then apply the checkpoint data to memory stored on the secondary computer. The amount of time required to complete a checkpoint is dependent on the number of pages included in that checkpoint. In one embodiment, the performance gain observed from parallelizing the operation for similarly sized checkpoints can be evaluated heuristically as part of an optimization process. This checkpoint process can be parallelized using the methods disclosed herein.

Figure 6B:
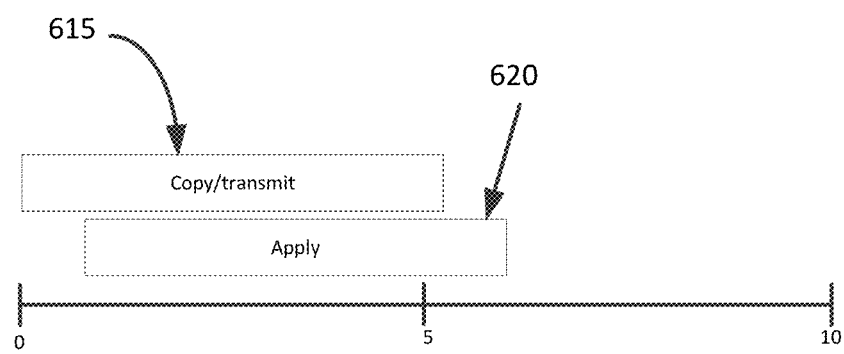
FIG. 6B is a diagram showing an embodiment of the timing of the transfer of data and the application of the data to memory as disclosed in the present disclosure.

Refer to FIG. 6B, which is a diagram showing an embodiment of the timing of the transfer of data and the application of the data to memory as disclosed in the present disclosure. As shown, there are still two steps. A first step 615 of copying or transmitting of checkpoint data from a primary computer to a secondary computer. A second step 620 of applying the checkpoint data to memory within the secondary computer. In contrast to the embodiment of FIG. 6A, however, the computer system of 6B begins applying the checkpoint data (step 620) upon receipt of one or more subsets of checkpoint data. As such, the computer system of FIG. 6B is capable of completing a checkpoint quicker than the system of FIG. 6A, even if the checkpoint data and hardware is the same in both embodiments.

Figure 7:
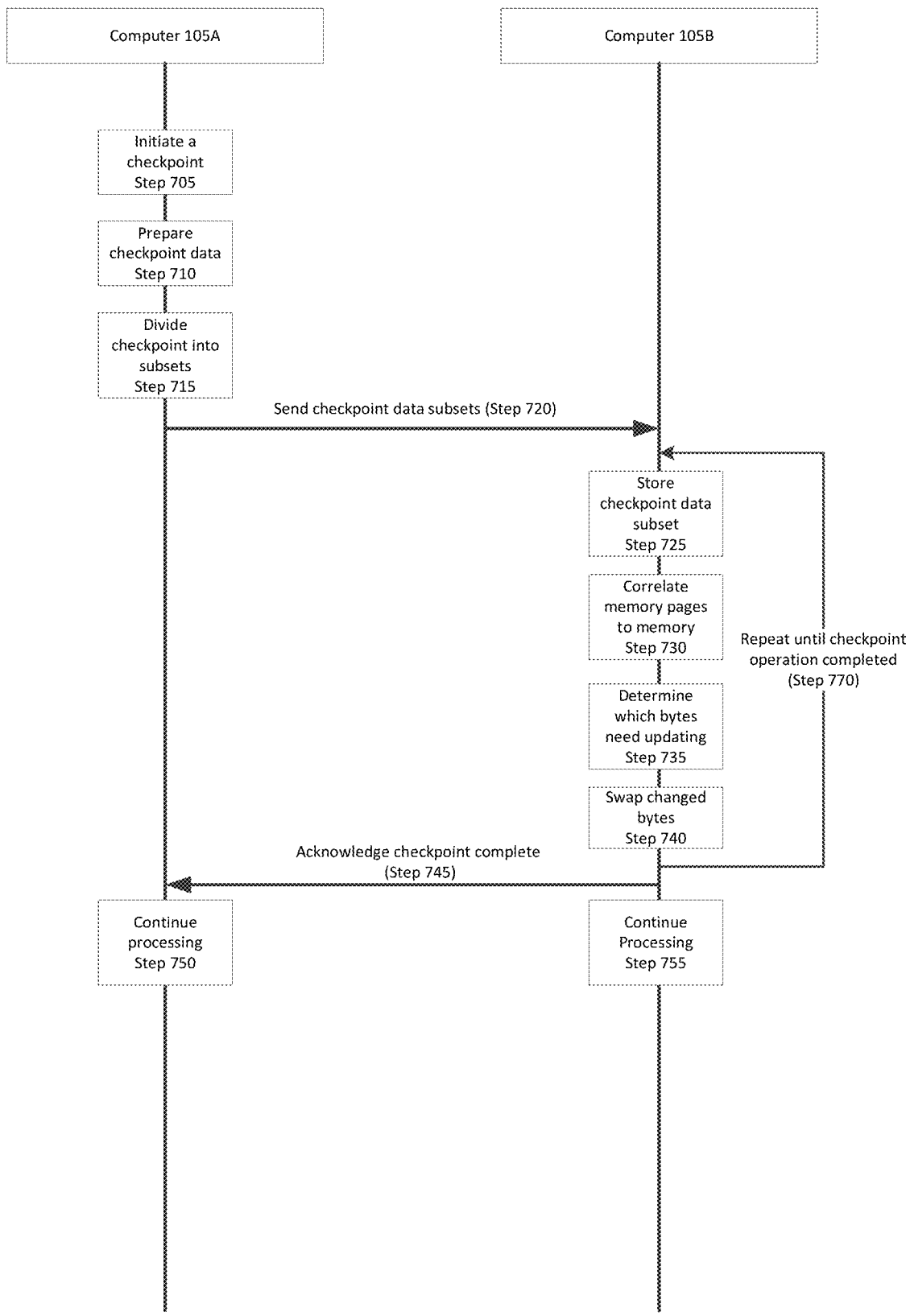
FIG. 7 is a diagram of a system copy and apply operation according to an embodiment of the present disclosure.

FIG. 7. is a diagram of a system copy and apply operation according to an embodiment of the present disclosure. In this embodiment, primary computer 105A determines that a checkpoint is needed and initiates a checkpoint (Step 705). Primary computer 105A prepares checkpoint data 125A (Step 710). In various embodiments, preparing checkpoint includes collecting each memory page in available memory 130A that has been modified since the last checkpoint. In other embodiments, checkpoint data is collected and prepared during operation of the primary computer 105A and the last remaining modified pages are collected after the initiation of a checkpoint. Primary computer 105A then divides the memory pages 305A of the checkpoint data 125A into checkpoint data subsets 310 (Step 715). Primary computer 105A sends each checkpoint data subset 310 to secondary computer 105B (Step 720). Upon receipt at the Secondary computer 105B, the secondary computer 105B stores each of the checkpoint data groups in reserved memory 120B (Step 725). In various embodiment, a portion, such as a minority or majority portion of a checkpoint is accumulated during operation of the primary as memory is modified. Accordingly, when a checkpoint is initiated only the last remaining modified pages need to be collected.

Using the table of contents within each of the checkpoint data groups, the secondary computer 105B correlates each memory page within each received checkpoint data group to a page in memory 130B (Step 730). Secondary computer 105B then compares each correlated set of memory pages to determine which bytes in the correlated memory pages need to be updated (Step 735). Subsequently, the secondary computer 105B then swaps the bytes in the correlated memory pages that need to be updated (Step 740). Once all of the checkpoint data from the primary computer 105A has been received and committed to memory 130B, the secondary computer 105B sends an acknowledgement to the primary computer 105A that the checkpoint operation has completed (Step 745). Steps 725, 730, 735, and 740 are repeated until each subset 310 of the checkpoint data 125A is copied to the secondary computer 105B and used to update the memory 130B. Upon completion of the checkpoint operation, both the primary computer 105A and the secondary computer 105B continue processing (Steps 750 and 755).

Figure 8:
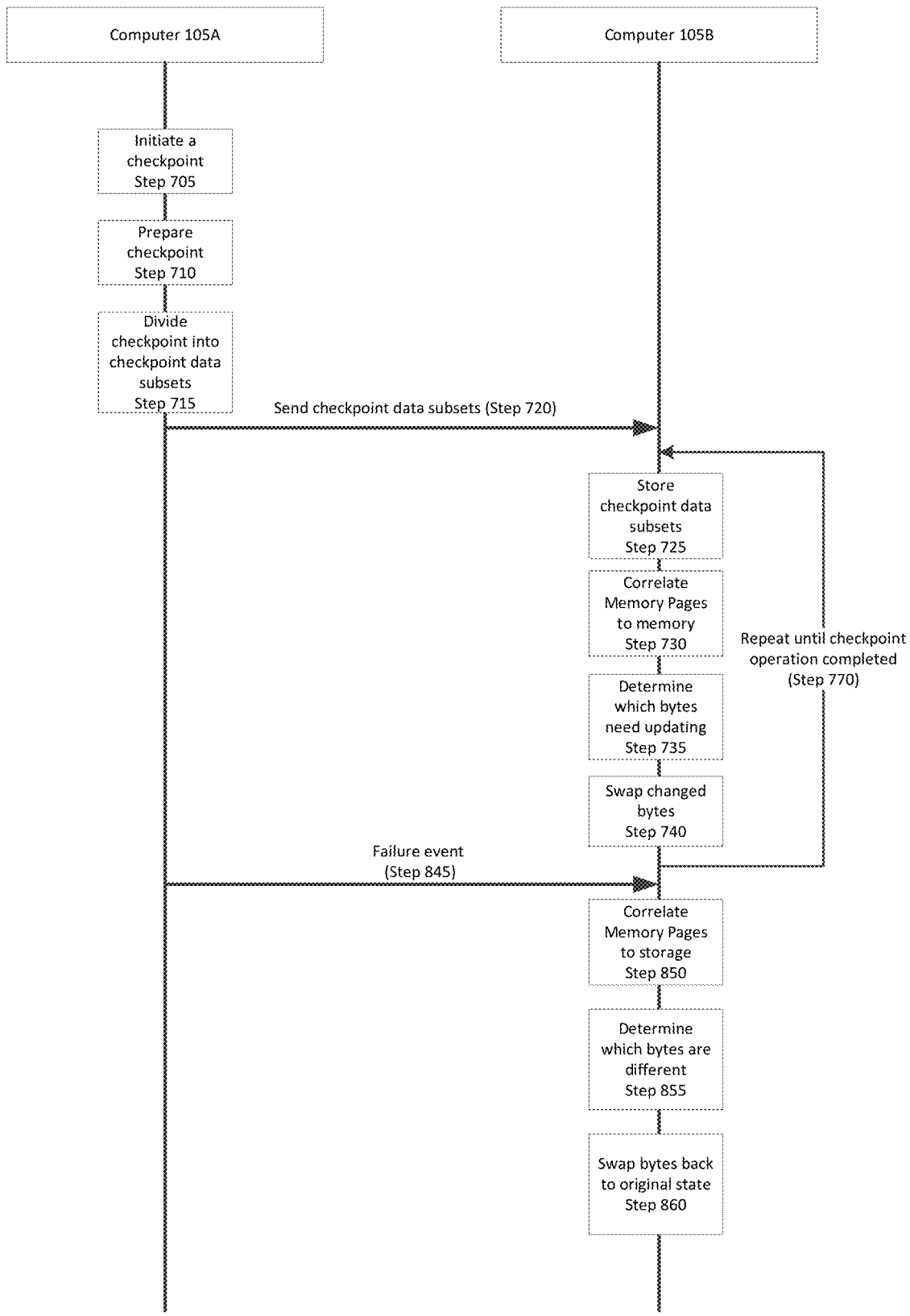
FIG. 8 is a diagram of an embodiment of a system operating after a failure event by the primary node.

Referring to FIG. 8, which is a diagram of an embodiment of a computer system operation after a failure event by the primary computer. As shown, the diagram is similar to FIG. 7. However, when a failure event occurs (Step 845), the failure leaves the secondary computer 105B without a complete set of checkpoint data 125A. In this situation, the secondary computer 105B rolls back any changes made to the available memory 130B due to the current checkpoint operation. Specifically, the secondary computer 105B correlates each memory page within each checkpoint data subset 310 stored in reserved memory 120B with a page stored in memory 130B. The secondary computer 105B determines which bytes of each modified memory page in memory 130B were updated during the checkpoint operation (Step 855) and reverts each byte back to a pre-checkpoint state by copying its previous value that is now stored in reserved memory 120B.

As a general embodiment, the disclosure relates to transferring a checkpoint from a primary to secondary computer using one or more operations that parallelize the checkpoint transmission and application operations. In one embodiment, a checkpoint "pipeline" or transmission path is created by breaking up, reorganizing, or dividing a checkpoint into smaller groups that are then transmitted to the secondary computer. Using such methods and systems as disclosed herein, the secondary does not wait for receipt of the entire checkpoint but applies each group to the secondary computer's memory image as it is received. In one embodiment, a group is a subset of a checkpoint. A given checkpoint can include a plurality of groups.

In one embodiment, the application of a checkpoint to the secondary computer's memory image is accomplished by the following steps on the entire checkpoint in N subsets or groups. In one embodiment, N ranges from 2 to 400. In one embodiment, a given group includes M units (pages). In one embodiment, M ranges from about 2 to about 511. In one embodiment, the number of pages transferred in a checkpoint operation is about 200,000 pages. In one embodiment, the maximum value of M is 511, which is the maximum number of pages that can comprise a subset. In one embodiment, the size of a subset is reflective of the number of pages transferred in a checkpoint operation. The steps that are performed may include one or more of:

Compare the contents of current memory against the checkpoint data received.

If the contents are equivalent, then continue on to the next segment/group of the checkpoint.

If there is a difference, then swap a given group between the checkpoint data and the secondary computer memory.

By implementing the application of a checkpoint in this manner, the checkpoint page data can serve as temporary storage of the current contents of memory. In the event a failure occurs, the checkpoint page data can be used to restore the memory image on the secondary to its state prior the current checkpoint.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The disclosure may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method of checkpointing in a system have a primary computer and a secondary computer, wherein each of the primary computer and the secondary computer comprise available memory and reserved memory, the method comprising:
   determining, by the primary computer, when to initiate a checkpoint operation;
   dividing, at the primary computer, a set of checkpoint data into a plurality of subsets, wherein each subset includes one or more memory pages of checkpoint data;
   looking up pages in available memory corresponding to each of the pages of checkpoint data located within a current subset;
   transmitting a subset of the plurality of subsets to the secondary computer;
   upon receiving, by the secondary computer, the subset, storing the subset of the plurality of subsets in reserved memory;
   correlating, by the secondary computer, the subset with pages in available memory on the secondary computer;
   determining, by the secondary computer, which bytes of the subset differ from the correlated available pages in the available memory in the secondary computer; and
   applying checkpoint data from the subset by swapping differences between the subset pages in reserved memory and stored data in correlated memory pages stored in the secondary computer.

2. The method of claim 1, wherein the differences are N-byte differences.

3. The method of claim 1, further comprising transmitting another subset of the plurality of subsets to the secondary computer in parallel with applying a current checkpoint data from a current subset.

4. The method of claim 1, wherein the step of applying the checkpoint data from subset occurs simultaneously with transmitting another subset from the plurality of subsets.

5. The method of claim 1, further comprising:
   upon notification of failure at the primary computer, reversing a portion of the entire checkpoint on the secondary computer by:
   swapping each of checkpoint data in available memory on the secondary computer with original data from available memory on the secondary computer that resides in reserved memory to restore data stored on the available memory of the secondary computer to a pre-checkpoint state.

6. A method of checkpointing in a system have a primary computer and a secondary computer, wherein each of the primary computer and the secondary computer comprise available memory and reserved memory, the method comprising:
   determining, by the primary computer, when to initiate a checkpoint operation;
   dividing, at the primary computer, a set of checkpoint data into a plurality of subsets, wherein each subset includes one or more memory pages of checkpoint data;
   transmitting a subset of the plurality of subsets to the secondary computer;
   upon receiving, by the secondary computer, the subset, storing the subset of the plurality of subsets in reserved memory;
   correlating, by the secondary computer, the subset with pages in available memory on the secondary computer;
   determining, by the secondary computer, which bytes of the subset differ from the correlated available pages in the available memory in the secondary computer, wherein determining, at the secondary computer comprises:
   comparing each byte within each memory page of a first group to each byte within a corresponding page stored memory in the secondary computer to determine which bytes of each memory page of the first group differ from a corresponding memory page in a data storage on the secondary computer; and
   applying checkpoint data from the subset by swapping differences between the subset pages in reserved memory and stored data in correlated memory pages stored in the secondary computer.

7. A method of checkpointing in a system have a primary computer and a secondary computer, wherein each of the primary computer and the secondary computer comprise available memory and reserved memory, the method comprising:
   determining, by the primary computer, when to initiate a checkpoint operation;

dividing, at the primary computer, a set of checkpoint data into a plurality of subsets, wherein each subset includes one or more memory pages of checkpoint data;

transmitting a subset of the plurality of subsets to the secondary computer;

upon receiving, by the secondary computer, the subset, storing the subset of the plurality of subsets in reserved memory;

correlating, by the secondary computer, the subset with pages in available memory on the secondary computer;

determining, by the secondary computer, which bytes of the subset differ from the correlated available pages in the available memory in the secondary computer;

applying checkpoint data from the subset by swapping differences between the subset pages in reserved memory and stored data in correlated memory pages stored in the secondary computer; and retaining each checkpoint subset in reserved memory on the secondary computer until an entire checkpoint has been applied to available memory on the secondary computer.

8. A method of checkpointing in a system having a primary computer and a secondary computer, wherein each of the primary computer and the secondary computer comprise available memory and reserved memory, the method comprising:

transmitting checkpoint data from a the primary computer to the secondary computer, the checkpoint data comprising K memory pages, wherein K is less than or equal to 512;

upon receiving, by the secondary computer, K memory pages, storing the K memory pages in reserved memory;

correlating, by the secondary computer, the K memory pages with secondary memory pages in available memory on the secondary computer;

determining, by the secondary computer, which bytes of the K memory pages differ from the correlated available secondary memory pages; and applying checkpoint data from the K memory pages by swapping differences between the K memory pages in reserved memory and stored data in the correlated available secondary memory pages stored in the secondary computer.

9. The method of claim 8 further comprising:

determining, by the primary computer, when to initiate a checkpoint operation.

10. A method of checkpointing in a system having a primary computer and a secondary computer, wherein each of the primary computer and the secondary computer comprise available memory and reserved memory, the method comprising:

transmitting checkpoint data from a the primary computer to the secondary computer, the checkpoint data comprising K memory pages;

upon receiving, by the secondary computer, K memory pages, storing the K memory pages in reserved memory;

correlating, by the secondary computer, the K memory pages with secondary memory pages in available memory on the secondary computer;

determining, by the secondary computer, which bytes of the K memory pages differ from the correlated available secondary memory pages; and applying checkpoint data from the K memory pages by swapping differences between the K memory pages in reserved memory and stored data in the correlated available secondary memory pages stored in the secondary computer, wherein the differences are N-byte differences, wherein N is selected from a group consisting of 2, 4, 8, 16, 32, 64, 128, 256, 512, or 1024.

11. A method of checkpointing in a system having a primary computer and a secondary computer, wherein each of the primary computer and the secondary computer comprise available memory and reserved memory, the method comprising:

if checkpoint data is equal to or greater than about M pages, dividing, at the primary computer, the checkpoint data into a plurality of subsets, wherein all subsets comprises the K memory pages;

transmitting checkpoint data from a the primary computer to the secondary computer, the checkpoint data comprising K memory pages;

upon receiving, by the secondary computer, K memory pages, storing the K memory pages in reserved memory;

correlating, by the secondary computer, the K memory pages with secondary memory pages in available memory on the secondary computer;

determining, by the secondary computer, which bytes of the K memory pages differ from the correlated available secondary memory pages; and applying checkpoint data from the K memory pages by swapping differences between the K memory pages in reserved memory and stored data in the correlated available secondary memory pages stored in the secondary computer.

12. The method of claim 11, wherein M is about 512.

* * * * *